United States Patent
Kanerva

(10) Patent No.: US 9,464,389 B2
(45) Date of Patent: Oct. 11, 2016

(54) ROAD REPAIR VEHICLE

(71) Applicant: Ronald Kanerva, Sudbury (CA)

(72) Inventor: Ronald Kanerva, Sudbury (CA)

( * ) Notice: Subject to any disclaimer, the term of this patent is extended or adjusted under 35 U.S.C. 154(b) by 0 days.

(21) Appl. No.: 14/849,997

(22) Filed: Sep. 10, 2015

(65) Prior Publication Data
US 2016/0060822 A1   Mar. 3, 2016

Related U.S. Application Data

(63) Continuation of application No. 14/474,662, filed on Sep. 2, 2014, now Pat. No. 9,157,199.

(51) Int. Cl.
| | |
|---|---|
| E01C 19/00 | (2006.01) |
| E01C 19/45 | (2006.01) |
| E01C 23/06 | (2006.01) |
| E01F 13/12 | (2006.01) |
| E01C 19/08 | (2006.01) |
| E02F 9/16 | (2006.01) |
| H04N 5/33 | (2006.01) |
| H04N 7/18 | (2006.01) |

(52) U.S. Cl.
CPC ............ *E01C 19/45* (2013.01); *E01C 19/002* (2013.01); *E01C 19/08* (2013.01); *E01C 23/06* (2013.01); *E01F 13/12* (2013.01); *E02F 9/163* (2013.01); *H04N 5/33* (2013.01); *H04N 7/181* (2013.01); *E01C 2301/00* (2013.01)

(58) Field of Classification Search
CPC ...... E01C 19/002; E01C 19/08; E01C 19/45; E01C 23/06; E01C 2301/00; E02F 9/163; H04N 7/181; H04N 5/33

USPC ....................................................... 404/6, 101
See application file for complete search history.

(56) References Cited

U.S. PATENT DOCUMENTS

| | | | |
|---|---|---|---|
| 1,965,881 | A | 7/1934 | Clark et al. |
| 2,257,637 | A | 9/1941 | Moore |
| 2,833,187 | A | 5/1958 | Well et al. |
| 3,217,620 | A | 11/1965 | Mindrum et al. |
| 3,260,176 | A | 7/1966 | Bowers |
| 3,625,120 | A | 12/1971 | Nagy |
| 3,967,913 | A | 7/1976 | Gabriel, Jr. |
| 4,012,160 | A | 3/1977 | Parker |
| 4,018,540 | A | 4/1977 | Jackson, Sr. |
| 4,133,574 | A | 1/1979 | Martin |
| 4,215,949 | A | 8/1980 | Gabriel, Jr. |
| 4,415,066 | A | 11/1983 | Mensik |
| 4,557,626 | A | 12/1985 | McKay et al. |

(Continued)

FOREIGN PATENT DOCUMENTS

| | | |
|---|---|---|
| CN | 203238526 | 10/2013 |
| DE | 3000037 | 7/1981 |
| DE | 3140902 | 12/1987 |

*Primary Examiner* — Raymond W Addie

(74) *Attorney, Agent, or Firm* — Gardner, Linn, Burkhart & Flory, LLP

(57) ABSTRACT

A road repair vehicle has an engine for powering the vehicle, a plurality of wheels, and a shelter structure supported above a road by the wheels, the shelter structure forming an enclosure for providing shelter to one or more road repair workers, the shelter structure having an open bottom to enable the one or more road repair workers to access the road to be repaired. The vehicle may be used to repair potholes. The vehicle includes a sensor for detecting a worker in a work area of the shelter structure and for automatically disabling at least one vehicle system in response to detecting the worker in the work area.

20 Claims, 2 Drawing Sheets

(56) References Cited

U.S. PATENT DOCUMENTS

| | | |
|---|---|---|
| 4,636,111 A | 1/1987 | Joyce |
| 4,676,689 A | 6/1987 | Yant |
| 4,678,363 A | 7/1987 | Sterner |
| 4,830,533 A | 5/1989 | Miller |
| 5,044,819 A | 9/1991 | Kilheffer et al. |
| 5,131,788 A | 7/1992 | Hulicsko |
| 5,251,999 A | 10/1993 | McCracken |
| 5,333,969 A | 8/1994 | Blaha et al. |
| 5,730,523 A | 3/1998 | Flood |
| 5,752,782 A | 5/1998 | Hulicsko |
| 6,450,522 B1 * | 9/2002 | Yamada .................. B60P 1/025 280/414.5 |
| 7,125,198 B2 | 10/2006 | Schiefferly et al. |
| 7,201,536 B1 | 4/2007 | Westbrook et al. |
| 7,318,069 B2 | 1/2008 | Takahashi et al. |
| 7,341,397 B2 | 3/2008 | Murphy |
| 7,354,218 B1 | 4/2008 | Dyke et al. |
| 8,016,516 B2 | 9/2011 | Johnson et al. |
| 8,322,945 B2 | 12/2012 | Groeneweg et al. |
| 8,806,689 B2 | 8/2014 | Riviere et al. |
| 2002/0191481 A1 | 12/2002 | Cox et al. |
| 2006/0007775 A1 | 1/2006 | Dean |
| 2015/0047132 A1 * | 2/2015 | Sveum ............... B65G 69/2882 14/71.1 |

\* cited by examiner

ROAD REPAIR VEHICLE

CROSS-REFERENCE TO RELATED APPLICATION

This application is a continuation of U.S. patent application Ser. No. 14/474,662, filed Sep. 2, 2014, now U.S. Pat. No. 9,157,199.

TECHNICAL FIELD

The present invention relates generally to vehicles and, in particular, to a vehicle for repairing potholes or other defects in a roadway.

BACKGROUND

It is well known that roads require repair and maintenance. Roads in harsh northern climates are more prone to wear and tear. Freeze-thaw cycles with water infiltration are known to crack asphalt and to create potholes. The repair of potholes is difficult work, especially in cold or inclement weather. A technical solution to this problem is highly desirable.

SUMMARY

The present invention provides a novel road repair vehicle that is especially useful as a pothole repair vehicle. The vehicle provides shelter to one or more workers at the site of a pothole. The vehicle drives over the pothole and stops. The workers repair the pothole using asphalt and tools carried by the vehicle.

Accordingly, an inventive aspect of the present disclosure is a road repair vehicle having an engine for powering the vehicle, a plurality of wheels and a shelter structure supported above a road by the wheels, the shelter structure forming an enclosure for providing shelter to one or more road repair workers, the shelter structure having an open bottom to enable the one or more road repair workers to access the road to be repaired. The vehicle includes a sensor for detecting a worker in a work area of the shelter structure and for automatically disabling at least one vehicle system in response to detecting the worker in the work area.

Another inventive aspect of the present disclosure is a road repair trailer having a plurality of wheels, a trailer hitch for connecting to a tractor-trailer coupling, and a shelter structure defining an enclosure sheltering one or more road repair workers, the shelter structure having a bottom that is open to enable the one or more road repair workers to repair the road from within the shelter structure. The trailer includes a sensor for detecting a worker in a work area of the shelter structure and for automatically disabling at least one vehicle system in response to detecting the worker in the work area.

This summary is provided to highlight certain significant inventive aspects but is not intended to be an exhaustive or limiting definition of all inventive aspects of the disclosure. Other inventive aspects may be disclosed in the detailed description and drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

FIGS. 1-6 depict a road repair vehicle in accordance with an embodiment of the present invention. The road repair vehicle is especially designed to function as a pothole repair vehicle (or mobile pothole patcher) but it also could be used to repair cracks, to re-surface asphalt, to fix manholes or sewer covers, or to perform other road repairs. In general, the vehicle depicted by way of example in FIGS. 1-6 provides a shelter or enclosure for one or more repair workers. This vehicle is especially useful in wintertime or in bad weather (rain, snow, freezing rain, sleet, etc.). Although the vehicle is primarily intended to provide shelter in cold or bad weather conditions, it may be used in any weather conditions, either day or night. In extremely hot conditions, the interior of the vehicle may be air-conditioned with the roof providing shade. The vehicle may also protect workers from rain, dust storms, or other undesirable weather conditions. Furthermore, the interior of the enclosure of the vehicle is lit by lights to enable the workers to work at night.

The vehicle may be a truck such as a tractor-trailer (or semi-trailer truck) as illustrated by way of example in FIGS. 1-6. The trailer may be modified or adapted from a container-style trailer to provide the features described herein. The vehicle illustrated by way of example includes a vehicle frame or chassis (i.e. a frame for the tractor supporting a cab and a frame for the trailer supporting the shelter structure), an internal combustion engine in the tractor coupled to a transmission and drive train for delivering torque to the drive wheels. The vehicle also includes a steering mechanism, braking mechanism, and a seat in the cab, a steering wheel and other vehicle controls in the cab for the driver. Alternatively, in another embodiment, a road repair trailer (or semi-trailer) is towed by a general-purpose tractor. The vehicle may also be a rigid-frame (non-articulated) truck, converted bus, or other special-purpose vehicle, having a shelter structure capable of housing workers inside the shelter structure while permitting access to the road from within the shelter structure.

The shelter structure may be composed of thin walls or panels, which may be made of any suitable material e.g. aluminum or other metal, plastic, composite material, etc. The walls may alternatively be made of a rigid framework covered with canvas or nylon fabric. In the illustrated embodiment, the left side wall and the right side wall are substantially parallel. The (exterior) roof and (interior) ceiling are substantially parallel to the floor pad and to the plane of the bottom opening. Other shapes may be employed to provide a shelter or enclosure for the workers.

Figure 1:
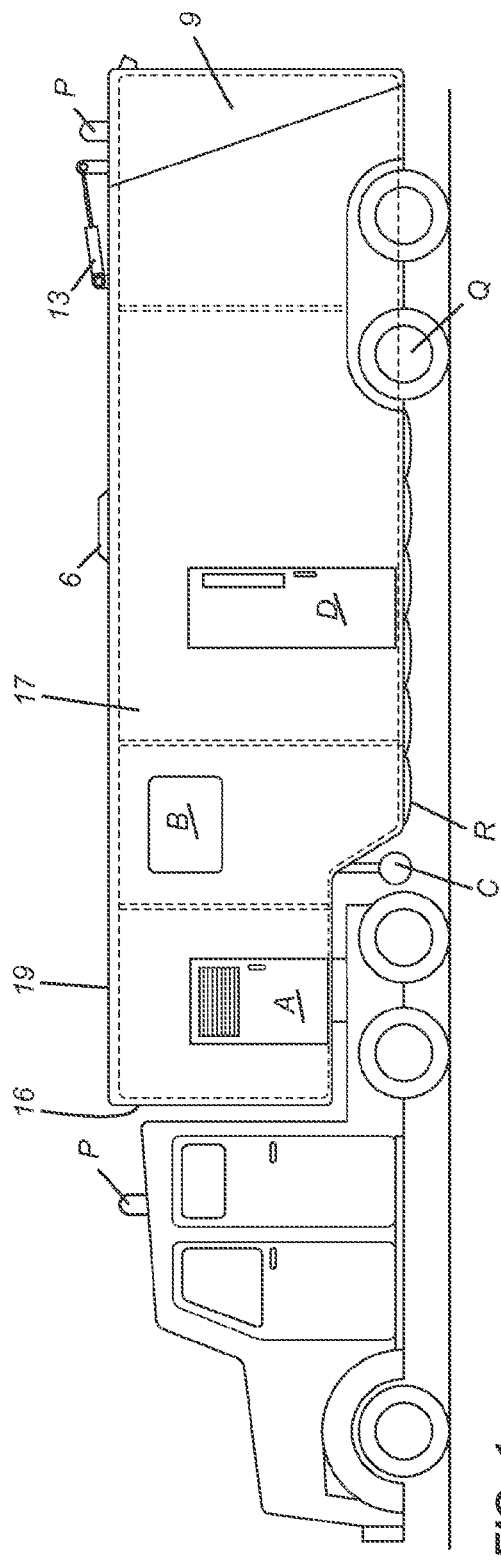
FIG. 1 is a side view of a road repair vehicle in accordance with an embodiment of the present invention.

FIG. 1 is a side view of a road repair vehicle in accordance with an embodiment of the present invention. The vehicle has a plurality of wheels denoted by reference character Q. The vehicle includes a pair of generator access doors A to access a generator room housing a generator 15 that generates electric power from a combustible fuel, e.g. the same diesel fuel that is used in the internal combustion engine of the tractor. The generator is mounted in the forward portion of the trailer as shown by way of example in FIG. 2. The generator may have its own fuel tank or it may be connected to the fuel tank of the vehicle.

As shown by way of example in FIG. 1, the vehicle may have one or more windows B to enable the workers to see outside. The vehicle may include landing wheels C that are deployable to stabilize the vehicle during repair work. Alternatively or additionally, the vehicle may deploy stabilizer legs with pivotal feet. The vehicle may also include one or more access doors D (for accessing the work area). The access doors may be located in the side walls as shown by way of example. One or more powered drop skirts R may be lowered to provide additional shelter to the workers. After the repair work is complete, each skirt is raised to avoid dragging the skirt along the ground as the vehicle moves. The vehicle may optionally include rotating beacons P (i.e. one flashing light on the roof of the tractor and one flashing light on the roof of the trailer). The rotating beacons warn other motorists of the presence of the stopped repair vehicle.

Figure 2:
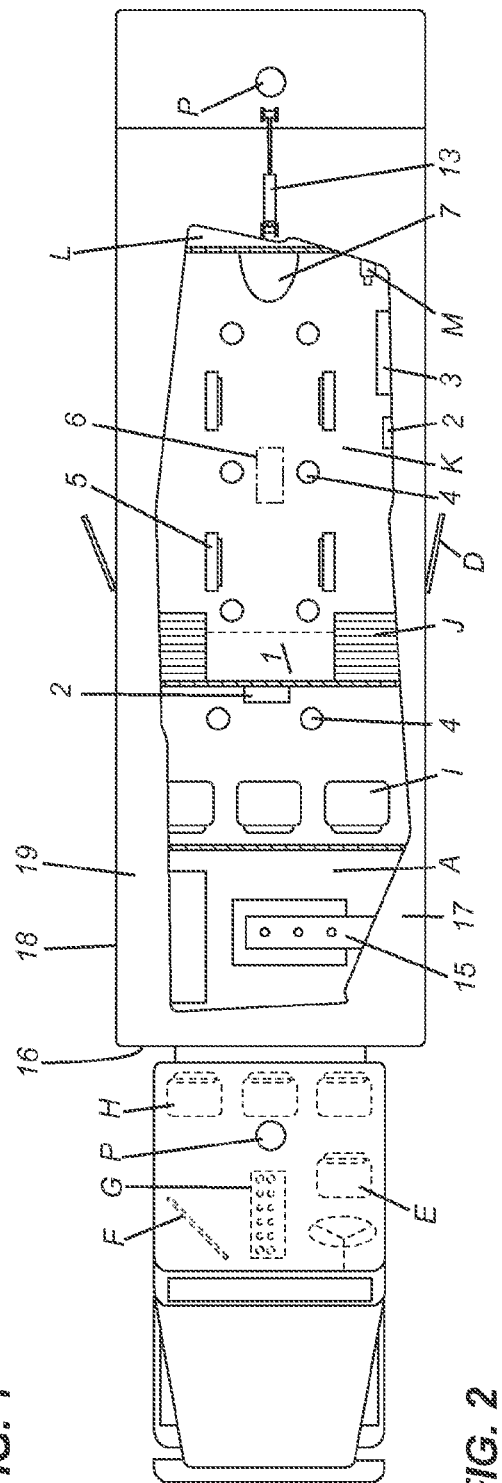
FIG. 2 is a top view of the road repair vehicle.

In the embodiment illustrated in FIGS. 1 and 2, the shelter structure comprises a front wall 16, a left side wall 17, a right side wall 18 (shown in FIG. 2), a roof 19 and a rear door 9. The shelter structure includes a work area K and a raised traveling/resting area situated between the work area and the generator room.

FIG. 2 is a top view of the road repair vehicle showing the driver's seat E in the cab of the tractor. The cab also houses one or more screens, monitors or displays F for viewing video imagery of the work area inside the trailer and also optionally behind the trailer. In the cab is a control console G which includes various controls or user interface elements (e.g. buttons, toggles, switches, levers, touch-screens, joysticks, etc.) for controlling the cameras and other equipment. The control console includes an emergency shutdown switch. In the illustrated embodiment, the rear of the cab may include a plurality of seats H for seating workers in a workers long travel position. In the embodiment illustrated in FIG. 2, the trailer also includes a plurality of seats I for seating workers in a workers short travel position. Although there are three seats H and three seats I in the embodiment depicted in FIG. 2, it will be appreciate that the number and configuration of the seats H, I may be varied. The shelter structure comprises side access doors D for the one or more workers to enter or exit the shelter structure. Two stairways J lead to a raised platform where there are a plurality of seats I on the raised platform.

Inside the shelter is a tool crib 1 which may be disposed between the stairways J. The tool crib may have racks, mounts and brackets for securely stowing tampers, chippers, heat guns, water pumps and air compressors. Power tools (e.g. electrically powered tampers, electrically powered chippers, electrically powered heat guns, electrically powered water pumps and electrically powered air compressors) may be powered by the generator 15. Electrical outlets in the tool crib area may be provided to connect the power tools or alternatively the tools may be hard-wired. Additional side-mounted tool cribs 3 are disposed within the shelter as shown by way of example in FIG. 2. The tool cribs 3 may have racks, mounts and brackets to securely stow shovels, rakes, brooms, picks, pry bars, etc.

Also shown by way of example in FIG. 2 are the interior work lights 4 for illuminating the work area inside the shelter. The lights may be powered by the generator.

For cold weather, the vehicle includes heaters, e.g. electric radiant heaters 5. Alternatively or additionally, the vehicle may include an air conditioner, dehumidifier or air-circulation fan. Ducts, blowers and vents may be provided to supplement any HVAC equipment. The HVAC equipment may be powered by the generator.

In the illustrated embodiment, a ventilation fan 6 is mounted in the ceiling and roof to extract heat and/or fumes from inside the shelter. The ventilation fan may be electrically powered, e.g. by the generator.

The vehicle may include various safety features to ensure that workers are not located in the work area of the shelter structure when the vehicle starts to move again after a repair is complete. For example, one or more park brake switches 2 may be disposed inside the shelter structure to enable the workers to control the parking brake. Each park brake switch 2 controls the parking brake of the vehicle to immobilize the vehicle.

Another safety feature is an emergency shutdown switch ("master kill switch") inside the shelter structure. This emergency shutdown switch causes the shutdown of one or more vehicle systems, subsystems or functions or may cause the total or partial shutdown of the vehicle engine, ignition system, transmission, power train, electrical system, etc.). In a main embodiment, the emergency shutdown switch may disable or shut down the generator and/or the engine. Work lights and cameras may, however, be on a separate circuit to maintain operation despite an emergency shutdown.

In one embodiment, the vehicle may include a sensor for detecting a worker in a work area of the shelter structure and for automatically disabling at least one vehicle system in response to detecting the worker in the work area. The sensor may be the camera connected to a processor executing a machine-vision algorithm to automatically recognize a worker in the work area and to automatically shut off the vehicle ignition, disable the engine or disengage the transmission from the engine. The sensor may alternatively be an infrared (IR) or thermal imaging camera capable of discerning the heat signature of a human body. The sensor may alternatively be a motion sensor, sound sensor or light beam tripwire for detecting the presence of a worker in the work area. Alternatively, the sensor may be a pressure sensor or force sensor for sensing the weight of each of the workers sitting in the seats. In this alternate embodiment, when all seat sensors sense the presence of a respective worker, the vehicle may be re-enabled.

Figure 3:
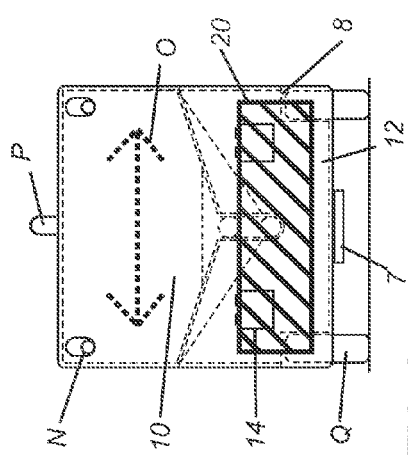
FIG. 3 is a rear view of the road repair vehicle.

FIG. 3 is a rear view of the road repair vehicle with its rear door 9 closed. The vehicle has a pair of rear cameras N. Rear directional lights (flashing arrows) denoted by letter O may be provided on the rear surface of the rear door 9 of the vehicle to warn motorists to pass the stopped vehicle either to the left or to the right. A lighted or blinking sign (e.g. with the word "CAUTION" or equivalent) may be provided on the external surface of the rear door. The heated floor pad 7 below the screw feed is visible. Note that the pad 7 occupies only a small amount of the bottom opening so that the bottom of the shelter structure is substantially open to the road beneath. In the illustrated embodiment, The floor pad represents less than 10% of the area of the bottom of the shelter structure. The pad provides a raised step for the workers to access the asphalt from the screw feed. This view also shows the waste material storage area 12 and the waste material doors 14.

Figure 4:
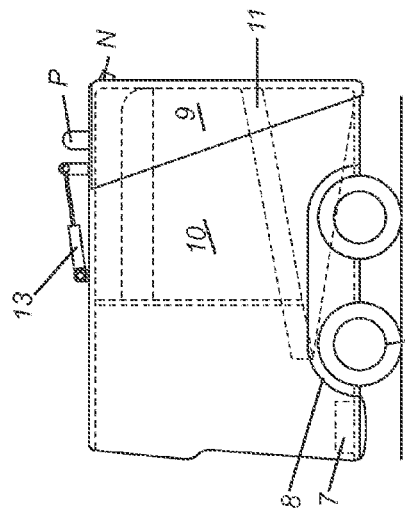
FIG. 4 is a side view of the road repair vehicle.

FIG. 4 is a side view of the road repair vehicle with its rear door 9 closed. The asphalt hopper 10 and electrically powered screw feed 11 (or auger) may be powered by the generator. It will be appreciated that the screw feed 11 may be replaced with any other suitable conveyor mechanism for delivering the asphalt. As shown by way of example in FIG.

4, the heated floor pad 7 is approximately at the elevation of the bottom of the wheel wells 8 of the wheels Q. FIG. 4 also shows that the roof-mounted actuator 13 is forward of the rotating beacon P in this particular embodiment. The actuator may also be powered by the generator. FIG. 4 also shows that the rear-mounted cameras N are angled downwardly in this particular embodiment.

Figure 5:
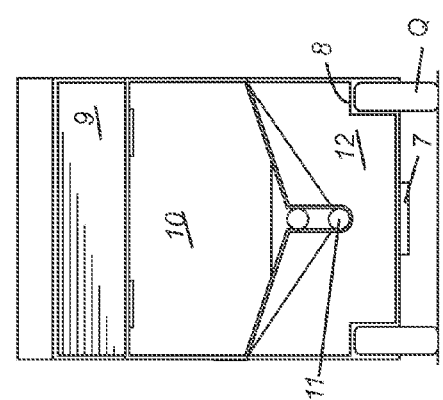
FIG. 5 is rear view of the road repair vehicle with its rear door open.

FIG. 5 is a rear view of the road repair vehicle with its rear door 9 open. When the rear door 9 is open, asphalt may be loaded into the hopper and waste material may be removed from the vehicle. The rear door 9 may be a full hatch that occupies the full rear face of the shelter structure as shown by way of example. Alternatively, the vehicle may have a rear wall or rear frame into which the door is pivotally mounted such that the rear door occupies only a portion of the rear surface of the shelter structure.

Figure 6:
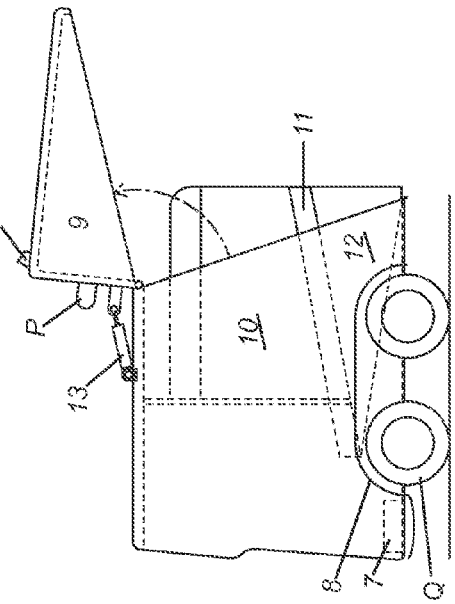
FIG. 6 is a side view of the road repair vehicle with its rear door open.

FIG. 6 is a side view of the road repair vehicle with its rear door 9 open. This figure depicts the upward pivoting (i.e. forward rotation) of the door 9 as it is opened by the roof-mounted actuator 13.

The workers may use this road repair vehicle to perform any known pothole repair technique such as the throw-and-roll repair technique, the semi-permanent repair method, the spray-injection procedure or the edge seal method.

For the purposes of this specification, the term "asphalt" is meant to encompass any equivalent road-repair material such as asphalt-based patch materials that are composed of a binder and aggregate, whether hot mix or cold mix.

For the purposes of this specification, the term "road" is meant to encompass any street, avenue, boulevard, highway, freeway, on-ramp, off-ramp, bridge, parking lot or other roadway that has a pothole requiring patching.

Various optional features may be added to the vehicle. For example, a GPS navigation system may be used to navigate to the locations of reported potholes. Reported potholes (with associated location information) may be transmitted wirelessly to the vehicle from a city road-management server that in turns receives pothole reports from pothole-reporting apps running on mobile communication devices. Once repaired, the vehicle may transmit a job-completion report to the server. The report may include the GPS coordinates, a digital photo of the repaired pothole, etc.

The shelter structure of the vehicle may also include a toilet or washroom, a drinking water fountain, tap or spigot, a refrigerator for storing food and drinks, a cooking station, first aid station, telephone, intercom for communicating with the driver in the cab, clothing locker, or any other equipment or devices for the workers.

In another implementation, the bottom surface of the shelter structure may include a removable or detachable panel or a panel that is folding or pivoting. In this implementation, the bottom surface may be temporarily covered up for long-distance travel (to improve aerodynamics or to prevent snow or slush from entering the work area.

The embodiments of the invention described above are intended to be exemplary only. As will be appreciated by those of ordinary skill in the art, to whom this specification is addressed, many obvious variations, modifications, and refinements can be made to the embodiments presented herein without departing from the inventive concept(s) disclosed herein. The scope of the exclusive right sought by the applicant(s) is therefore intended to be limited solely by the appended claims.

The invention claimed is:

1. A road repair vehicle comprising:
   an engine for powering the vehicle;
   a plurality of wheels;
   a shelter structure supported above a road by the wheels, the shelter structure forming an enclosure for providing shelter to one or more road repair workers, the shelter structure having an open bottom to enable the one or more road repair workers to access the road to be repaired; and
   a park brake switch inside the shelter structure.

2. The vehicle as claimed in claim 1 further comprising an asphalt hopper mounted inside the shelter structure.

3. The vehicle as claimed in claim 2 further comprising a screw feed mounted inside the shelter structure for cooperating with the hopper to move asphalt.

4. The vehicle as claimed in claim 3 further comprising a heated floor pad below the screw feed.

5. The vehicle as claimed in claim 1 wherein the shelter structure comprises a front wall, a left side wall, a right side wall, a roof and a rear door.

6. The vehicle as claimed in claim 5 wherein the rear door of the shelter structure is powered by a roof-mounted actuator.

7. The vehicle as claimed in claim 1 further comprising a plurality of lights disposed on a ceiling of the shelter structure to illuminate the road.

8. The vehicle as claimed in claim 1 further comprising a plurality of heaters disposed on a ceiling of the shelter structure to provide warmth to the one or more workers.

9. The vehicle as claimed in claim 1 wherein the roof comprises a ventilation fan.

10. The vehicle as claimed in claim 1 wherein the shelter structure comprises side access doors for the one or more workers to enter or exit the shelter structure, stairs to a raised platform, and a plurality of seats on the raised platform.

11. The vehicle as claimed in claim 1 further comprising a plurality of cameras and further comprising a display in a cab of the vehicle for displaying imagery from the cameras.

12. The vehicle as claimed in claim 1 further comprising an emergency shutdown switch inside the shelter structure.

13. A road repair trailer comprising:
    a plurality of wheels;
    a trailer hitch for connecting to a tractor-trailer coupling;
    a shelter structure defining an enclosure sheltering one or more road repair workers, the shelter structure having a bottom that is open to enable the one or more road repair workers to repair the road from within the shelter structure; and
    a park brake switch inside the shelter structure.

14. The road repair trailer as claimed in claim 13 further comprising an asphalt hopper mounted inside the shelter structure.

15. The road repair trailer as claimed in claim 14 further comprising a screw feed mounted inside the shelter structure for cooperating with the hopper to move asphalt.

16. The road repair trailer as claimed in claim 15 further comprising a heated floor pad below the screw feed.

17. The road repair trailer as claimed in claim 13 wherein the shelter structure comprises a front wall, a left side wall, a right side wall, a roof and a rear door.

18. The road repair trailer as claimed in claim 17 wherein the rear door of the shelter structure is powered by a roof-mounted actuator.

19. The road repair trailer as claimed in claim 13 further comprising a plurality of lights disposed on a ceiling of the shelter structure to illuminate the road.

20. The road repair trailer as claimed in claim 13 wherein the shelter structure comprises side access doors for the one or more workers to enter or exit the shelter structure, stairs to a raised platform, and a plurality of seats on the raised platform.

\* \* \* \* \*